United States Patent Office 3,528,160
Patented Sept. 15, 1970

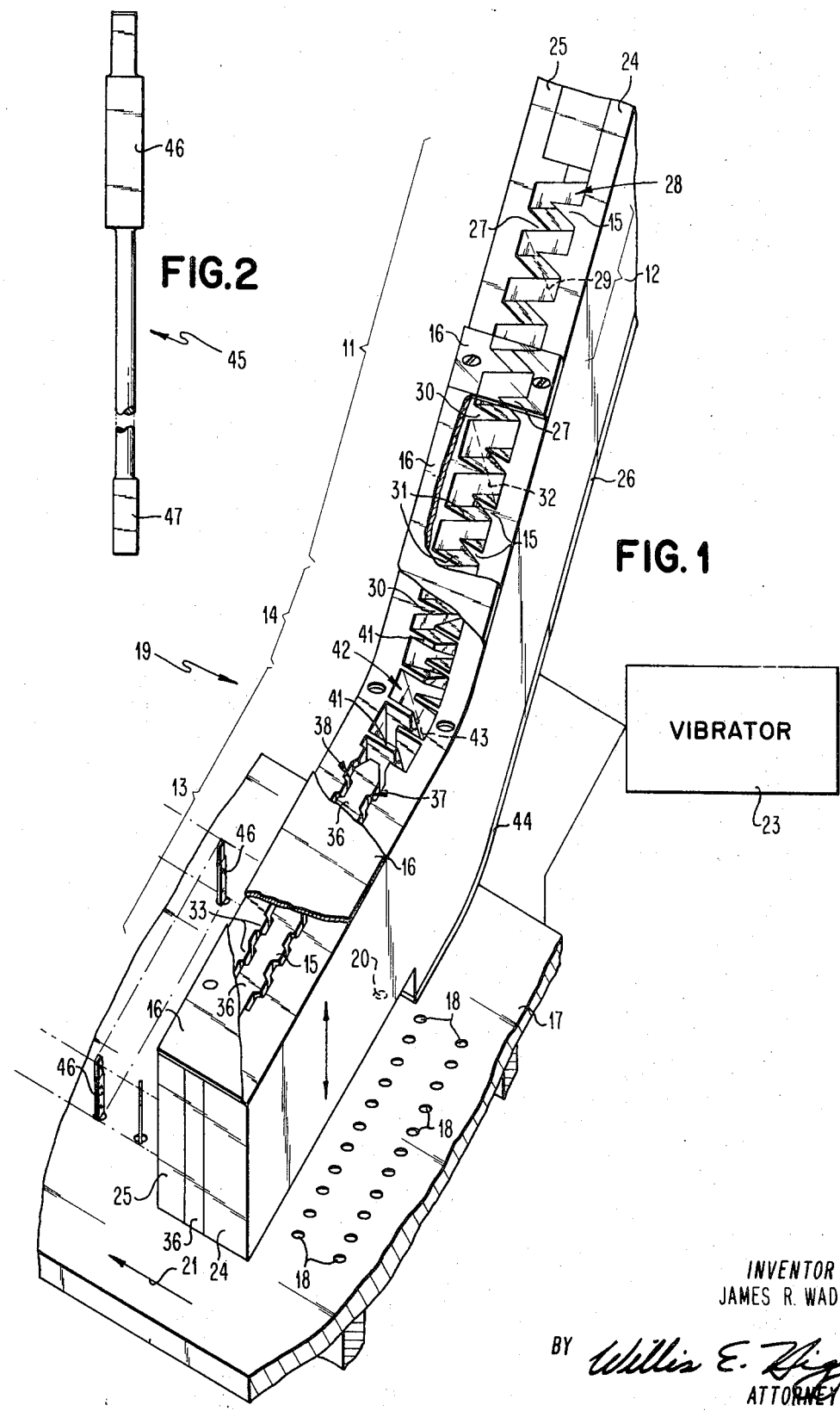

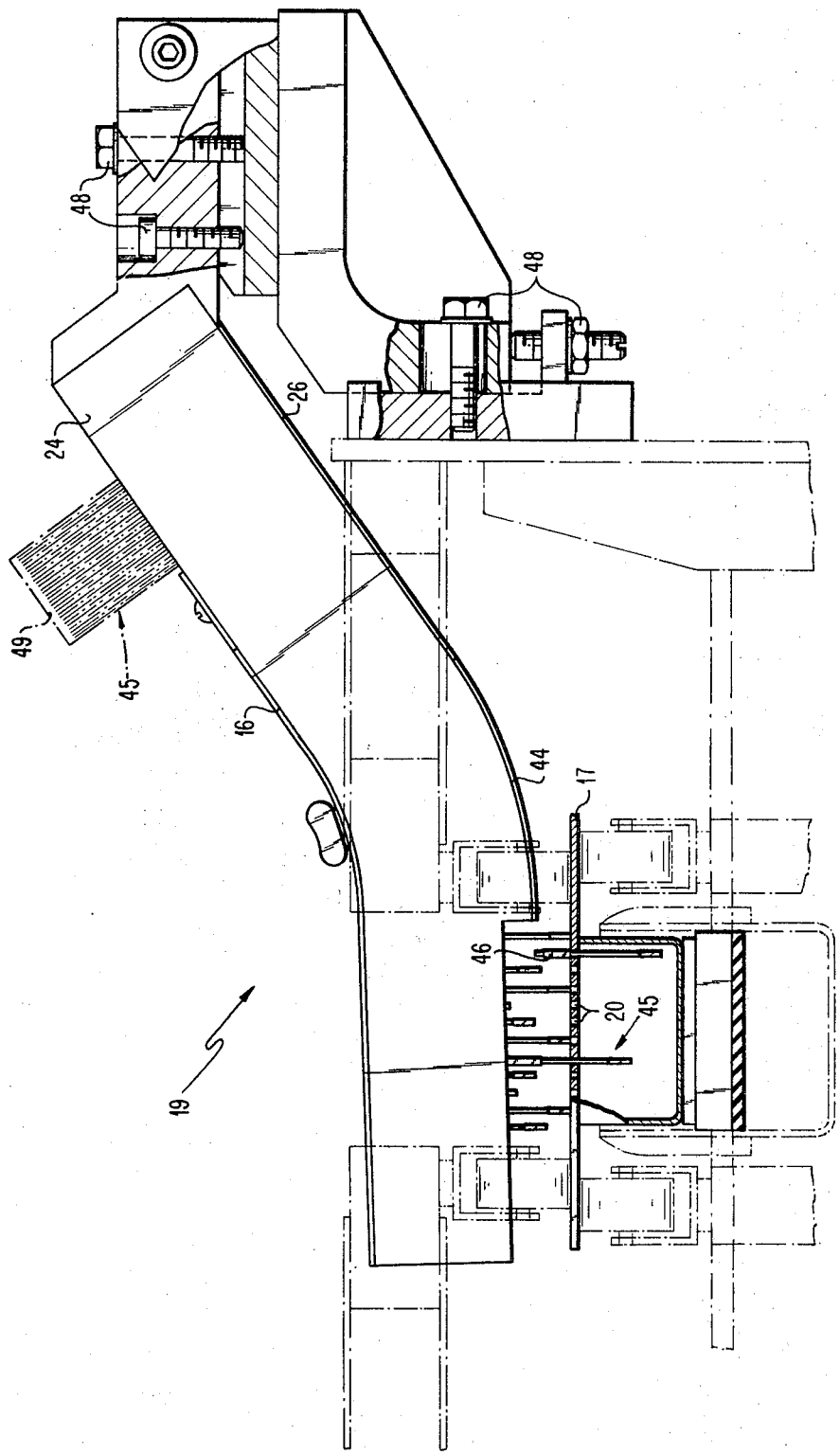

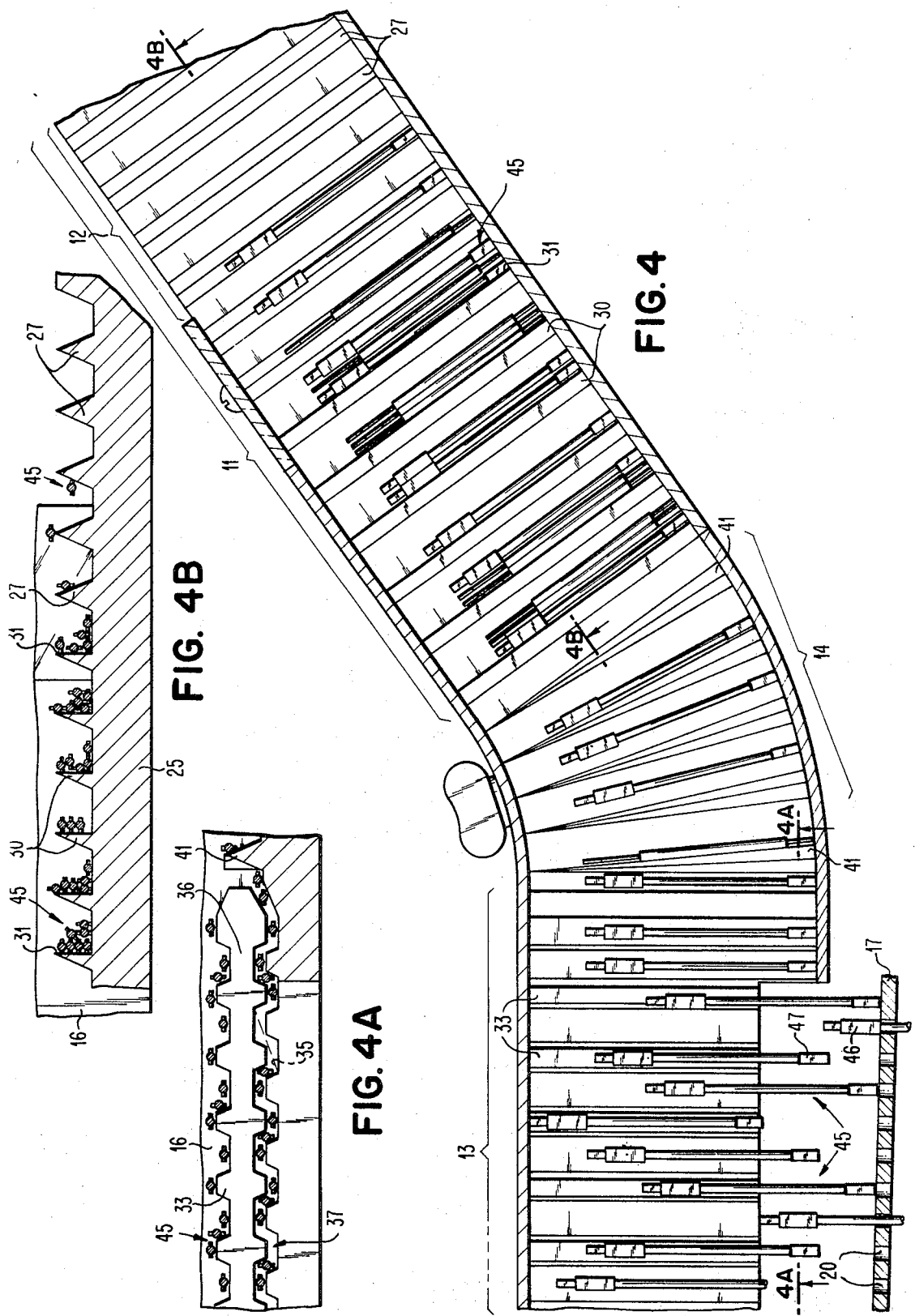

3,528,160
APPARATUS AND PROCESS FOR HANDLING NEEDLE-LIKE OBJECTS
James R. Wadleigh, Williston, Vt., assignor to International Business Machines Corporation, Armonk, N.Y., a corporation of New York
Filed Dec. 5, 1967, Ser. No. 688,154
Int. Cl. B23p 11/00; H01h 11/00; H05k 13/00
U.S. Cl. 29—429                                                                          11 Claims

ABSTRACT OF THE DISCLOSURE

An apparatus for the vibratory feeding of needle-like objects and for loading the objects into a matrix is described. The apparatus comprises an inclined channel into which the needle-like objects are loaded in substantially parallel alignment, a substantially horizontal channel into which the objects move in a substantially parallel and vertical alignment for dispensing from the aparatus, and means connecting the two channels through which the objects may pass. The channels contain a plurality of baffles for regulating the movement of the needle-like objects and for maintaining them in substantially parallel alignment. The disclosed apapratus will provide the needle-like objects to a desired location at a relatively constant density. It may be used with a matrix having a succession of holes into which the objects may be loaded, means for moving the matrix relative to the apparatus to bring the holes near the feed point sequentially, and means for vibrating the objects. The claimed apparatus and process is particularly useful for loading reed switch levers.

FIELD OF THE INVENTION

This invention relates to an apparatus for the vibratory handling and feeding of needle-like objects. More particularly, it relates to an apparatus for providing needle-like objects at a relatively constant density in a desired location. It further relates to a device and process for loading needle-like objects into a matrix or series of matrices.

DESCRIPTION OF THE PRIOR ART

It is known in the art to load needle-like objects into holes by positioning the objects near the holes and vibrating the objects to make them move about and fall into the holes. Such a process is disclosed, for example, in U.S. Pat. 3,241,222. It is also known to suspend needle-like objects in a magnetic field and move a matrix having a number of holes to be filled with the objects into the magnetic field. Such a process is disclosed, for example, in U.S. Pat. 3,061,919. However, a disadvantage associated with such processes and apparatus as disclosed in the prior art is that, whether they depend on gravity or magnetic energy or both to load the needle-like objects into holes, they are for essentially batch operation only. Another problem associated with the prior art methods and apparatus is that they tend to damage the needle-like objects, such as by bending.

Apparatus for feeding diodes to a desired location is known. For example, U.S. Pat. 3,115,235 discloses an inclined guideway for feeding diodes horizontally and in sequence to a rotating wheel. However, such apparatus is incapable of feeding needle-like objects to a desired location at a relatively constant density, and it is not used to feed objects vertically for loading them into holes in a matrix.

Automatic article feeding apparatus is necessary for the manufacture of small electrical components, such as reed switches, in production quantities. The reed switch consists of reed switch levers, or small needle-like contacts which are disposed from opposite ends of a small glass cylinder, with the ends of the levers in overlapping relationship inside the cylinder for the purpose of allowing the levers to touch or move apart to complete an electrical circuit. The ends of the glass cylinder are melted to seal the reed switch levers in the cylinder. Electrical contacts are made with the ends of the levers protruding from the cylinders, and a circuit may be completed by bringing the two levers together, such as by magnetic force induced by a coil. The prior art has attempted to provide methods for handling these reed switch levers during manufacture of the reed switches, but the prior art methods have been unsuitable to meet the demands of high volume reed switch production.

SUMMARY OF THE INVENTION

It is therefore an object of this invention to load needle-like objects into a matrix using continuous feeds.

It is a further object of the invention to provide needle-like objects at a relatively constant density to a desired location, independently of the rate at which the objects are removed from this location.

It is a further special object of the invention to load needle-like objects into a matrix continuously and to provide the objects at the loading area at a relatively constant density.

It is yet another object of the invention to load needle-like objects which are susceptible to damage by bending into a matrix at a rapid rate.

It is another object of the invention to provide a method for rapid loading of needle-like objects into a matrix that is applicable to such objects made of either magnetic or non-magnetic materials.

It is yet another special object of the invention to increase the rate at which needle-like objects may be loaded into a matrix while decreasing the number of such needle-like objects that are bent during the loading operation.

These and other related objects may be attained through use of the apparatus of this invention. The apparatus has an inclined channel having an end into which the needle-like objects may be loaded in substantially parallel alignment and a substantially horizontal channel or feeding area into which the objects move in a substantially parallel and vertical alignment for dispensing from the apparatus. Means are provided, through which the needle-like objects may pass, connecting the inclined channel and the substantially horizontal channel. A plurality of baffles in the channels regulate the movement of the needle-like objects in the apparatus and maintain the objects in substantially parallel alignment. This apparatus has the ability to provide the needle-like objects in substantially vertical alignment at a relatively constant density in a desired location.

The feeding apparatus described above may be employed in conjunction with a matrix having a succession of holes into which it is desired to load the needle-like objects, means for moving the matrix relative to the feeding apparatus to bring the holes near a feed point sequentially, and means for vibrating the needle-like objects. In such combination, there is provided a device for carrying out a novel process for loading needle-like objects into a succession of holes in a matrix. The needle-like objects are provided in substantially vertical alignment at a relatively constant density to a feeding area. A matrix having a succession of holes into which the needle-like objects may be loaded is moved with respect to the feeding area to bring the holes near the feeding area sequentially. The needle-like objects are vibrated to allow them to fall into the holes.

Such a process may be carried out on a continuous basis, and when the claimed apparatus is employed, very few, if any, of the needle-like objects are damaged by bending or otherwise.

In the device and process for loading needle-like objects into holes in a matrix claimed herein, it is especially important that the feeding means have the capacity to provide the needle-like objects at a relatively constant density. The objects must have a high enough density in the feeding area to fill the holes in the matrix. If the density is too high, the needle-like objects will be prevented from falling out of the feeding area. The ability of the claimed apparatus to provide the needle-like objects at a relatively constant density enables the density to be maintained in the feeding area within these limits.

The foregoing and other objects, features, and advantages of the invention will be apparent from the following more particular description of the preferred embodiments of the invention, as illustrated in the accompanying drawings.

BRIEF DESCRIPTION OF THE DRAWINGS

In the drawings:

FIG. 1 is an isometric drawing of a preferred form of the claimed vibratory feeding apparatus in combination with a matrix into which needle-like objects are to be loaded;

FIG. 2 is an enlarged drawing of a reed switch lever which may be fed using the claimed apparatus;

FIG. 3 is a side view of the device shown in FIG. 1;

FIG. 4 is an enlarged side view of the device as in FIG. 3, but with portions removed, in order to show the placement of needle-like objects in the apparatus and the way the needle-like objects are loaded in the matrix;

FIG. 4A is a section of the apparatus, taken along the line 4A in the FIG. 4 and showing details of the baffle configuration in a feeding area; and FIG. 4B is a section of the apparatus, taken along the line 4B in FIG. 4 and showing details of the baffle configuration in an inclined channel and the way the needle-like objects interact with the baffles in the inclined channel.

DESCRIPTION OF THE PREFERRED EMBODIMENTS

In the following description, the invention will be described as a device and process for loading reed switch levers into holes in a matrix plate. However, the claimed vibratory feeding apparatus may be employed to feed other needle-like objects than reed switch levers, and it may be used to feed such needle-like objects in substantially vertical alignment at a relatively constant density in a desired location for other purposes than filling a succession of holes in a matrix plate with the needle-like objects.

Referring now to the drawings, more particularly to FIG. 1, there is shown a presently preferred embodiment of an apparatus for the vibratory feeding of reed switch levers. As shown, the apparatus has an inclined channel 11 with an end 12 into which the reed switch levers may be loaded in parallel alignment and a substantially horizontal channel or feeding area 13 into which the objects move in a parallel, substantially vertical alignment for dispensing from the apparatus. An arcuate channel portion 14, through which the needle-like objects may pass, connects the inclined channel 11 to the substantially horizontal channel 13. A plurality of baffles 15 are provided in the channels for the purpose of regulating the movement of the needle-like objects in the apparatus and also for maintaining the objects in parallel alignment. These baffles help prevent variations in weight due to varying amounts of levers above them from being transmitted to the substantially horizontal channel 13. In cooperation with back pressure exerted by objects in the substantially horizontal channel, they enable the needle-like objects to be maintained in the substantially horizontal channel 13 in relatively constant density. This insures that the objects can be maintained in this channel in a sufficient density for their desired use, yet below the density at which they would tend to be packed in this channel and not fall from it. The dimensions and placement of the baffles relative to the size of the needle-like objects to be fed are such that the objects are prevented from falling over in the channels. The channels are also preferably provided with covers 16 (some or all of which may be transparent to allow visual observation) to prevent the needle-like objects from jumping out of the channels as they are vibrated.

When it is desired to use the vibratory feeding apparatus in a device for loading needle-like objects into a matrix, it may be combined with other elements to give a device comprising a matrix 17 having a succession of holes 18 into which the needle-like objects may be loaded, means 19 (the vibratory feeding apparatus) for providing the needle-like objects in substantially vertical alignment at relatively constant density near a hole 20 to be loaded, means (not shown) for advancing the matrix 17 in the direction of the arrow 21 to bring the holes 18 in each column under the feeding area 13 sequentially, and means for vibrating the needle-like objects. In practice, the easiest method to vibrate the needle-like objects is by vibrating the vibratory feeding apparatus, the matrix, or both, with a vibrator 23.

FIGS. 1, 3, and 4 show the various parts which are preferably used to make the claimed apparatus. As shown, substantially parallel, spaced apart members 24 and 25 define the channels of the claimed apparatus, including inclined channel 11 along which the needle-like objects may move in parallel alignment. The channel 11 has a loading end 12 into which the objects may be loaded in substantially parallel alignment, a bottom 26 for supporting the objects in the channel, and baffles 27 at the feeding end 12 of the channel 11, which baffles 27 define an angular path 28 for the objects as they move along the channel. Each leg 29 of the angular path 28 must be short enough with respect to the length of the needle-like objects in order to prevent them from falling over in the channel, i.e., to maintain them in substantially parallel alignment. In the inclined channel 11, following the angular path 28, baffles 30 are provided with leading faces 31 projecting into the channel and substantially perpendicular to the overall direction of motion of the objects along the channel. These baffles 30 serve to maintain a constant density of the needle-like objects in the apparatus below them, because the weight of needle-like objects above these baffles 30 and within these baffles 30 presses against the leading faces 31. Since variations in the total weight of needle-like objects above and within these baffles cannot be transmitted to the area below them, a constant density of the needle-like objects may be provided at the feeding area 13. As is in the case of baffles 27, the baffles 30 serve also to maintain the objects in substantially parallel alignment, since each leg 32 of the pathway through them is short enough to prevent the objects from falling over.

In the substantially horizontal channel 13 (which comprises the feeding area) along which the objects may move in substantially vertical and substantially parallel alignment, the objects are free to fall from the channel when they reach a desired feed point, since this channel has no bottom. The substantially horizontal channel 13 has baffles 33 defining an angular path 37 or 38 for the objects. Like the angular path 28, these angular paths 37 or 38 serve to maintain the objects in substantially parallel alignment, since each leg 35 (shown in FIG. 4A) of them is short enough to prevent the needle-like objects from falling over in the channel.

The substantially horizontal channel is also preferably provided with a wedge member 36 disposed in the channel. This wedge member serves to divide the channel 13 into the two paths 37 and 38, and it also serves to direct some of the needle-like objects into each path. More than one path is provided for the purpose of filling the few holes of the matrix which are not filled with the needle-like objects when they pass under the first path 37.

An intermediate arcuate channel portion 14 along which the needle-like objects may move in parallel alignment serves to connect the inclined channel 11 and the substantially horizontal channel 13. This intermediate channel portion 14 has baffles 41 defining an angular path 42 for the objects as they move along the channel portion 14. As in the case of the angular paths 28 and 37 or 38, each leg 43 of the angular path 42 is short enough to prevent the needle-like objects from falling over in the channel, thus serving to maintain the objects in substantially parallel alignment. This intermediate arcuate channel portion 14 also has a bottom 44 for supporting the needle-like objects in it.

FIGS. 3, 4, 4A and 4B show details of the claimed apparatus in operation. The reed switch levers 45 are dumped from a container 49 holding, e.g., several hundred of them in parallel vertical alignment (shown in phantom in FIG. 3) into loading end 12 of the vibratory feeding apparatus. The reed switch levers 45 move rapidly through the angular path 28 until they reach the baffles 30 with leading faces 31 substantially perpendicular to the overall direction of motion of the levers 45. The rapid passage through the angular path 28 allows feeding of additional reed switch levers to the loading end 12 almost immediately.

As shown in FIGS. 4 and 4B the reed switch levers 45 pass from the loading end 12 into the area of baffles 30 and press against the leading faces 31 of the baffles 30. Weight from the reed switch levers 45 above and within the area of baffles 30 is thus not transmitted beyond these baffles, except when individual levers drop from this area.

As the reed switch levers pass through the baffles 30, they enter the intermediate arcuate channel portion 14, through which they pass to the substantially horizontal channel 13. The baffles 41 in this intermediate channel portion serve to maintain the objects in substantially parallel alignment. Since this channel portion serves merely to convey the reed switch levers to the substantially horizontal channel 13, it is not usually necessary for these baffles to adjust for weight differential in the manner of baffles 30. However, if the angle of inclination of the inclined channel 11 is large enough, flat leading faces should be used on the first few baffles in this portion. These baffles 41 are tapered from top to bottom as shown in FIG. 4 to allow for the different arc radii of the top and bottom of this intermediate arcuate channel portion 14.

The reed switch levers, while still being vibrated, now pass into the substantially horizontal channel 13. The combination of the vibration and the slight forward slant of the substantially horizontal channel 13 imparts a conveying force to the reed switch levers 45. The levers move into this area and feed to the end of the paths 37 and 38. When the pressure exerted by levers impinging against this end and transmitted back by the vibrating levers in the paths 37 and 38 equals the conveying force tending to bring them to this area, a given density of levers will be established in the feeding area. In much the same way as a liquid in a pipe exerts back pressure to prevent additional liquid from flowing into it until a valve is opened to allow liquid to flow from the pipe, additional reed switch levers will pass through the baffles 30 only as reed switch levers already in the substantially horizontal channel 13 drop into holes 20 in the matrix 17 to be loaded.

As the reed switch levers 45 in the feeding area 13 are vibrated, they move around the holes 20 until one reed switch lever falls into each hole 20. A flattened portion 46 on the reed switch levers is larger than the diameter of the holes 18, and the lever therefore is maintained in the hole with only the portion of the lever above the flattened area protruding from the hole.

FIG. 4 shows a portion of the feeding area 13 and the way the reed switch levers move therein in response to the vibration imparted to them. As shown, the levers distribute themselves in the substantially horizontal channel at a density that is dependent on a balance between the force feeding the levers into this area and the back pressure exerted by levers already in the area. Once this balance is achieved, additional reed switch levers enter the feeding area only as levers fall through the channel and enter holes 20 in the matrix plate 17.

Since the reed switch levers in the paths 37 and 38 transmit back pressure to carry out the important density regulating function, the widths of these paths should be kept sufficiently narrow to prevent dissipation of this back pressure. In the case of the present apparatus, these pathways are preferably maintained between at least 1 and less than 3 times the cross section diameter of the needlelike objects which are fed with it. As will be observed below, the pathway width needs to be controlled within more precise limits in the case of the reed switch levers to prevent jamming, due to their special configuration.

It is preferred to have the distance between the matrix plate 16 covering thesubstantially horizontal channel. If nel such that the motion of the reed switch levers due to the vibratory energy imparted to them will cause substantially all of the levers to strike the portion of the top plate 16 covering the substantially horizontal channel. If this is done, a desirable periodicity in the motion of the reed switch levers results. In the case of the reed switch lever depicted in FIG. 2, which has a length of 1.3875 ± .0025 inches, a distance between the matrix plate and the top of the substantially horizontal channel of about 1.7 inches is preferred for this purpose. The pattern shown in FIG. 4 is duplicated in each of the pathways 37 and 38 in the substantially horizontal channel.

All but a very few of the holes in the matrix plate are filled as they pass beneath the first pathway 37 of the substantially horizontal channel. The second pathway 38 is provided for the purpose of filling these few holes which are not filled by the first pathway, and obviously, the second pathway may be omitted if desired.

FIG. 2 represents an enlarged view of one of the reed switch levers 45 which may be fed using the apparatus of the present invention. While the apparatus is well suited for feeding simple elongated needle-like objects without an upper flat portion 46 and a lower flat portion 47, it has found particular application for feeding these reed switch levers, which present unique problems of their own. For example, the width of the paths 37 and 38 in the apparatus must be controlled within rather precise limits to prevent jamming of the reed switch levers 45 in them. The width of the upper flat portion 46 in the reed switch levers employed is .051 ± .002 inch. To prevent jamming, the paths should have a width of .055 + .005 − .0015 inch. The width of the lower flat portion 47 is .0330 ± .0005 − .0008 inch. To allow passage of this flat portion through the holes 18 in the matrix plate 17, yet not allow more than one lever to enter the hole, the diameter of the holes should be .039 ± .001 inch. In order to maintain these levers in substantially parallel alignment in the channels of the apparatus, the longest nonsupporting path or leg in the channels should be no longer than about half the portion of the reed switch lever that is within the channel. The cross section diameter of the reed switch shown is 0.0240 inch.

The reed switch lever 45 shown in FIG. 2 weighs approximately .003 ounce. For feeding this particular needle-like object 45 in the system described, a vertical vibration having an amplitude of 0.100 inch and a frequency of about 1,200 c.p.m. may be employed. The amplitude and frequency may be varied on a linear basis. Thus, if an amplitude of 0.050 inch is employed, a frequency of about 2,400 c.p.m. is used. For this reed switch lever, angles of inclination in the inclined channel 11 of from 30 to 40 degrees have been proven suitable. Obviously, the character of vibrations employed and the angle of incliniation in the inclined channel 11 will vary with dicerent needle-like objects. These two factors will also vary depending on the particular form of the angular paths in the channels of the apparatus. The angle of inclination of the apparatus (as well as the alignment of the feeding apparatus and the matrix plate) may be altered by use of the adjusting screws 48 shown in FIG. 3.

The feeding area 13 has been described as a substantially horizontal channel. It is preferred to have this channel incline forward slightly as shown in FIG. 3 (e.g., from 0.001 to 2 degrees from the horizontal) or have the baffles 33 incline slightly forward from the vertical a corresponding amount. This inclination is necessary if the vibration imparted to the levers is vertical. However, if the vibration has a sufficient horizontal component, inclination of the loading area in this manner is not necessary.

It should also be noted that the channels 37 and 38 in the feeding area 13 extend beyond the last hole in the matrix plate 17. This feature is preferably incorporated in the apparatus to give an area into which bent, misshapen, or upside down levers (which will not fall into the holes in the matrix) may pass. Such levers acumulate in this area where they will not interfere with the feeding operation, and they may be removed periodically.

In practice, it has been found desirable to mount the feeding apparatus by fastening the loading end 12 to suitable supporting members. The end of the feeding area 13 is preferably not fastened down. Freedom of motion at this end gives better distribution of the reed switch levers in the feeding area.

In summary, there has been shown and described a continuous feed and distribution system for reed switch levers and other needle-like objects operating at a desired density and rate, which employs vibration to feed the needle-like objects. Vibration causes the needle-like objects to feed down the inclined portion of the apparatus and into two distribution channels. The geometry of the channels restricts the needle-like objects from becoming packed against each other by controlling their density, serves to support the objects, and keeps a proper orientation of them. Due to a slight forward slant of the baffle walls in the feeding area, the variation of the apparatus, and the vibration of the moving matrix into which the objects are loaded, the objects continuously feed from their storage reserve in the inclined area into and across the feeding channels to keep the available object supply replenished. As a matrix to be loaded passes under the objects in the feeding channels, one needle-like object drops from the channel into each hole in the matrix. If a needle-like object from the first channel fails to fill a particular hole, an object from the second channel will be available to fill the hole. The apparatus has a demonstrated capacity to load 180,000 levers every eight hours into matrices having an array of 99 holes each.

It should now be apparent that an apparatus and process capable of performing the stated objects has been provided. With reference to the special objects stated, there has been provided an apparatus and process suitable for furnishing needle-like objects at a relatively constant density to a desired location. Secondly, a device and process which increases the rate at which needle-like objects may be loaded into a matrix while decreasing the number of such objects which are bent during the loading operation has been provided.

While the invention has been particularly shown and described with reference to preferred embodiments thereof, it will be understood by those skilled in the art that various changes in form and details may be made therein without departing from the spirit and scope of the invention.

What is claimed is:
1. A device for loading needle-like objects into a matrix, which comprises:
 (A) a matrix having a succession of holes into which the needle-like objects may be loaded,
 (B) means for providing the needle-like objects in substantially vertical alignment at a relatively constant density to a feeding area near one of the holes,
 (C) means for moving the matrix with respect to the means for providing the objects to bring the holes near the feeding area, sequentially, and
 (D) means for vibrating the needle-like objects.
2. The device of claim 1 wherein the needle-like objects are reed switch levers.
3. An apparatus for the vibratory feeding of needle-like objects, which comprises:
 (A) an inclined channel having an end into which the needle-like objects may be loaded in parallel alignment,
 (B) a substantially horizontal channel into which the objects move in a substantially parallel and vertical alignment for dispensing from the apparatus,
 (C) means connecting the inclined channel and the substantially horizontal channel, through which the needle-like objects may pass, and
 (D) a plurality of baffles in the channels for regulating the movement of the needle-like objects in the apparatus and for maintaining the objects in parallel alignment.
4. A device for the orientation of needle-like objects, which comprises:
 (A) a matrix having a succession of holes into which the needle-like objects may be loaded,
 (B) the apparatus of claim 3,
 (C) means for moving the matrix with respect to the vibratory feeding apparatus to bring the holes near the feed point sequentially, and
 (D) means for vibrating the needle-like objects.
5. The device for claim 4 wherein the needle-like objects are reed switch levers.
6. An apparatus for the vibratory feeding of needle-like objects, which comprises substantially parallel spaced-apart members defining:
 (A) an inclined channel along which the objects may move in parallel alignment, the channel having:
  (a) a loading end into which the objects may be loaded in parallel alignment,
  (b) a bottom for supporting the objects in the channel,
  (c) baffles with leading faces projecting into the channel and substantially perpendicular to the overall direction of motion of the objects along the channel, the baffles serving to maintain the objects in substantially parallel alignment and to regulate the density of the objects in the apparatus beyond the baffles,
 (B) A substantially horizontal channel along which the objects may move in substantially parallel and vertical alignment, the objects being free to fall from the channel when they reach a desired feed point, the horizontal channel having baffles in the channel defining an angular path for the objects as they move along the channel, the angular path serving to maintain the objects is substantially parallel alignment, and
 (C) An intermediate arcuate channel portion along which the objects may move in substantially parallel alignment and connecting the inclined channel and the substantially horizontal channel, the intermediate channel portion having:
  (a) baffles defining an angular path for the objects as they move along the channel portion, the angular path serving to maintain the objects in substantially parallel alignment, and (b) a bottom for supporting the objects in the channel portion.

7. The apparatus of claim 6 additionally comprising, in the inclined channel at the loading end, baffles defining an angular path for the objects as they move along the channel, the angular path serving to maintain the objects in substantially parallel alignment.

8. The apparatus of claim 7 wherein the substantially horizontal channel has a plurality of pathways and means serving to direct some of the objects into each pathway, baffles defining an angular path for the objects being located in each pathway.

9. The apparatus of claim 8 wherein the needle-like objects are reed switch levers.

10. A process for loading needle-like objects into a matrix, which comprises:
(A) providing the needle-like objects in substantially vertical alignment at a relatively constant density to a loading area,
(B) moving a matrix having a succession of holes into which the needle-like objects may be loaded with respect to the loading area to bring the holes beneath the loading area sequentially, and
(C) vibrating the needle-like objects to allow them to fall into the holes.

11. The process of claim 10 wherein the needle-like objects are reed switch levers.

References Cited

UNITED STATES PATENTS

| | | | |
|---|---|---|---|
| 3,067,495 | 12/1962 | Chase | 29—241 X |
| 3,127,669 | 4/1964 | Reber et al. | 29—203 |
| 3,241,222 | 3/1966 | Timmermans | 29—203 |

THOMAS H. EAGER, Primary Examiner

U.S. Cl. X.R.

29—622, 203